United States Patent
Mottier et al.

(10) Patent No.: US 7,558,237 B2
(45) Date of Patent: Jul. 7, 2009

(54) DEVICE AND METHOD OF DYNAMICALLY ASSIGNING SUBGROUPS OF SPREADING SEQUENCES

(75) Inventors: David Mottier, Rennes Cedex 7 (FR); Damien Castelain, Rennes Cedex 7 (FR); Nadine Chapalain, Rennes Cedex 7 (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 444 days.

(21) Appl. No.: 11/143,995

(22) Filed: Jun. 3, 2005

(65) Prior Publication Data

US 2005/0286460 A1    Dec. 29, 2005

(30) Foreign Application Priority Data

Jun. 25, 2004    (EP) .................. 04291606

(51) Int. Cl.
H04B 7/216    (2006.01)
(52) U.S. Cl. .................. 370/335; 370/329; 370/441
(58) Field of Classification Search .......... 370/130, 370/328, 335, 1.002, 329, 341, 342, 431, 370/441, 140
See application file for complete search history.

(56) References Cited

U.S. PATENT DOCUMENTS

| | | | | |
|---|---|---|---|---|
| 6,108,369 | A * | 8/2000 | Ovesjo et al. | 375/146 |
| 6,160,520 | A * | 12/2000 | Muhlhauser et al. | 343/755 |
| 6,233,231 | B1 * | 5/2001 | Felix et al. | 370/335 |
| 6,546,041 | B1 * | 4/2003 | Fujimoto | 375/140 |
| 6,577,671 | B1 * | 6/2003 | Vimpari | 375/146 |
| 7,069,577 | B2 * | 6/2006 | Geile et al. | 725/106 |
| 7,280,552 | B2 * | 10/2007 | Isson | 370/441 |
| 2002/0146060 | A1 * | 10/2002 | Ertel et al. | 375/130 |
| 2003/0086364 | A1 * | 5/2003 | Horne | 370/208 |

FOREIGN PATENT DOCUMENTS

EP    1 085 689 A1    3/2001

OTHER PUBLICATIONS

David Mottier, et al., "A Spreading Allocation Procedure for MC-CDMA Transmission Systems", IEEE VTC 2000, vol. 3, Sep. 24, 2000, XP010524702, pp. 1270-1275.

(Continued)

*Primary Examiner*—Quochien B Vuong
(74) *Attorney, Agent, or Firm*—Oblon, Spivak, McClelland, Maier & Neustadt, P.C.

(57) ABSTRACT

A method of communication in a Multi-Carrier transmission network including plural mobile terminals. The method includes dynamically assigning subgroups of spreading sequences of a set of spreading sequences to each of the mobile terminals. Each of the subgroups includes different spreading sequences than in other subgroups, and each of the subgroups of spreading sequences includes a first spreading sequence and at least one other spreading sequence. The method also includes multiplying, by the mobile terminal to which the first spreading sequence is assigned, each element of the first spreading sequence by pilot symbols to be transmitted to produce multiplied pilot symbols; transmitting the multiplied pilot symbols on a corresponding sub-carrier; multiplying, by the mobile terminal to which the at least one other spreading sequence is assigned, each element of the at least one other spreading sequence by data symbols to be transmitted to produce multiplied data symbols; and transmitting the multiplied data symbols on a corresponding sub-carrier.

12 Claims, 4 Drawing Sheets

OTHER PUBLICATIONS

Harri Holma, et al., "WCDMA for UMTS", John Wiley & Sons, Ltd., GB, 2001, XP002274240, pp. 25-38, 84-97, 130-147.

"Universal Mobile Telecommunications System (UMTS); Spreading and Modulation (FDD) (3GPP TS 25/213 Version 3.4.0 Release 1999)", ETSI TS 125 213, European Telecommunications Standards Institute, FR, vol. 3-R1, No. V340, Dec. 2000, XP014008378, pp. 1-27.

AS Madhukumar, et al., "Performance Studies of a Multi-Band Multicarrier CDMA System with a Simplified Receiver Structure Using Despreader Before Equalizer", International Symposium on Personal, Indoor and Mobile Radio Communication Proceedings, IEEE PIMRC 2003, vol. 2, Sep. 7, 2003, XP010678108, pp. 2631-2635.

M. Hasan, et al., "A Novel Low Power Pipelined Architecture for a MC-CDMA Receiver", Proceedings of the $3^{rd}$ International Symposium on Image and Signal Processing and Analysis, ISPA 2003, vol. 2, Sep. 18, 2003, XP010705110, pp. 1048-1053.

R. Kanchanawat, et al., "V-BLAST Technique for Uplink MC-CDMA Systems in Rich Scattering Environment", Wireless Communications And Networking Conference, WCNC 2004/IEEE Communications Society, vol. 1, Mar. 21, 2004, XP010708358, pp. 104-107.

David Mottier, et al., "Channel Pre- and Post-Equalization in Uplink OFCDM Systems with Mobility", International Symposium on Personal, Indoor and Mobile Radio Communication Proceedings, IEEE PIMRC 2003, vol. 1, Sep. 7, 2003, XP010681706, pp. 809-813.

\* cited by examiner

| | | | | | | | |
|---|---|---|---|---|---|---|---|
| 501 — 1 | 1 | 1 | 1 | 1 | 1 | 1 | 1 |
| 502 — 1 | -1 | 1 | -1 | 1 | -1 | 1 | -1 |
| 503 — 1 | 1 | -1 | -1 | 1 | 1 | -1 | -1 |
| 504 — 1 | -1 | -1 | 1 | 1 | -1 | -1 | 1 |
| 505 — 1 | 1 | 1 | 1 | -1 | -1 | -1 | -1 |
| 506 — 1 | -1 | 1 | -1 | -1 | 1 | -1 | 1 |
| 507 — 1 | 1 | -1 | -1 | -1 | -1 | 1 | 1 |
| 508 — 1 | -1 | -1 | 1 | -1 | 1 | 1 | -1 |

DEVICE AND METHOD OF DYNAMICALLY ASSIGNING SUBGROUPS OF SPREADING SEQUENCES

BACKGROUND OF THE INVENTION

1. Field of the Invention

The present invention concerns a method of dynamically assigning subgroups of spreading sequences of a set of spreading sequences to mobile terminals of a Multi-Carrier transmission network, such as a Multi-Carrier Code Division Multiple Access transmission network, better known by the name MC-CDMA network.

2. Discussion of the Background

MC-CDMA has been receiving widespread interest for wireless broadband multimedia applications. MC-CDMA combines OFDM (Orthogonal Frequency Division Multiplex) modulation and the CDMA multiple access technique. This multiple access technique was proposed for the first time by N. Yee et al. in the article entitled "Multicarrier CDMA in indoor wireless radio networks" which appeared in Proceedings of PIMRC'93, Vol. 1, pages 109-113, 1993. The developments of this technique were reviewed by S. Hara et al. in the article entitled "Overview of Multicarrier CDMA" published in IEEE Communication Magazine, pages 126-133, December 1997.

It is known that the propagation channel can be obstructed by houses and other obstacles located between the transmitter and the receiver. The transmitted signal is then propagated on multiple paths, each path being delayed and attenuated differently. It should be understood that the propagation channel then acts as a filter whose transfer function varies with time.

The ability of MC-CDMA transmission networks to provide orthogonality between the signals of the different mobile terminals in the network (and therefore to prevent any interference between these signals) depends on the intercorrelation properties of the spreading sequences which are assigned to the mobile terminals of the network.

Typically, in the case of transmissions on a mobile radio channel from a set of mobile terminals to a base station, the signals transmitted by mobile terminals are received synchronously at the base station. The radio channel between each mobile terminal and the base station cannot be considered as an uniform channel and the same between each mobile terminal and the base station. Under these conditions, the base station has to simultaneously estimate a plurality of radio channels on each sub carrier composing the OFDM multiplex.

In their paper "An asynchronous spread spectrum multicarrier multiple access system" Proceeding of IEEE GLOBECOM 1999, vol 1, pages 314 to 319, December 1999, S Kaiser and W. A Krzymien introduce an additional Frequency Division Multiple Access component between mobile terminals and the base station, so that the base station has to estimate only one channel for each sub-carrier. That spread spectrum multi-carrier multiple access system losses some spreading properties, which may require more stringent frequency planning to cope with cellular environment.

SUMMARY OF THE INVENTION

The aim of the invention is therefore to propose a method which makes it possible to compensate the radio channel variations between mobile terminals and the base station. Furthermore, the aim of the invention is also to provide a spreading sequences allocation method and an equalization method which is simple to implement in a base station.

To that end, the present invention concerns a method of dynamically assigning subgroups of spreading sequences of a set of spreading sequences to mobile terminals of a Multi-Carrier transmission network, characterised in that each subgroup of spreading sequences comprises different spreading sequences than the spreading sequences comprised in other subgroups of spreading sequences, each subgroup of spreading sequences comprising a first spreading sequence and at least one other spreading sequence, each element of the first spreading sequence being, by the mobile terminal of which the first spreading sequence has been assigned, multiplied by pilot symbols to be transmitted and then transmitted on a corresponding sub-carrier and each element of the at least one other spreading sequence being, by the mobile terminal of which the spreading sequence has been assigned, multiplied by data symbols to be transmitted and then transmitted on a corresponding sub-carrier.

Thus, it is possible to compensate the radio channel variations between mobile terminals and the base station. By using spread pilot symbols, the estimation of a plurality of channels at the base station becomes feasible and efficient with a low complexity detection scheme.

According to a particular feature, each first spreading sequence of a subgroup of spreading sequence is the spreading sequence which minimizes the interferences coming from the other spreading sequences of the subgroup of spreading sequences.

Thus, by assigning the spreading sequence which minimizes the interferences coming from the other spreading sequences of the subgroup of spreading sequences it belongs to, the channel estimation is more accurate. The data symbols, transmitted in parallel with the pilot symbols, are better detected.

According to a particular feature, the set of spreading sequences is decomposed into a plurality of ordered groups of spreading sequences, the ordered groups of spreading sequences are divided into non overlapping subgroups of spreading sequences, an optimised ordered group of spreading sequences among the ordered groups of spreading sequences is determined by minimizing the degradation that is experienced between spreading sequences of each respective subgroup and the subgroups of spreading sequences comprised in the optimised ordered group are assigned to mobile terminals.

According to a particular feature, the determination of the optimised ordered group is made by calculating, for each subgroup of each ordered group of spreading sequences, a cost function which takes into account the maximal degradation that is experienced by pairs of spreading sequences of the subgroup and the optimised ordered group of spreading sequences is determined as the ordered group of spreading sequences which comprises the subgroups of which the maximum value of the calculated cost function among each subgroup is minimum.

Thus it is possible to determine the optimised ordered group of spreading sequences, among the all possible ordered groups of spreading sequences, which comprises the subgroups of spreading sequences which reduce the effects of the interference on the performance of a Multi-Carrier transmission network According to a particular feature, the spreading sequences are Walsh-Hadamard sequences, the subgroups of spreading sequences are composed of the lines or the columns of a natural Walsh-Hadamard matrix.

According to a particular feature, the first line or column of a subgroup is consecutive, in the natural Walsh-Hadamard matrix, to the last line or column of another subgroup of spreading sequences.

Thus, it is possible to reduce the effects of the interference on the performance of a Multi-Carrier transmission network using a simple spreading sequences assignment technique. By simply assigning the spreading sequences in the order of a natural Walsh-Hadamard matrix to users of the Multi-Carrier transmission network, interferences are reduced a lot and the assignment itself is not complex to implement. Such assignment procedure occurs continuously in a Multi-Carrier transmission network, it is then important to simplify as much as possible the assignment procedure.

According to a particular feature, subgroups of spreading sequences are adjacent.

Thus, the assignment is simplified.

According to a particular feature, the Multi-Carrier transmission network is a Multi-Carrier Code Division Multiple Access transmission Network.

According to still another aspect, the present invention concerns a method of equalization of data symbols transmitted by mobile terminals to a base station in a Multi-Carrier Code Division Multiple Access transmission Network, characterised in that the method comprises the steps, executed by the base station of:
- de-spreading pilot symbols transmitted by each mobile terminal by multiplying the pilot symbols by a predetermined spreading sequence of a subgroup of spreading sequences allocated to the mobile terminal which transmits the pilot symbols,
- de-spreading data symbols transmitted by each mobile terminal by multiplying the data symbols by the other spreading sequences of the subgroup of spreading sequences allocated to the mobile terminal which transmits the data symbols,
- estimating the channel frequency response between each mobile terminal and the base station based on the observation of the de-spread pilot symbols transmitted by the respective mobile terminal.
- equalizing each de-spread data symbols according to the estimation of the channel frequency response between the respective mobile terminal which transmits the data symbols and the base station.

According to still another aspect, the present invention concerns a base station which receives spread symbols from mobile terminals in a Multi-Carrier Code Division Multiple Access transmission Network, characterised in that the base station comprises:
- means for de-spreading pilot symbols transmitted by each mobile terminal by multiplying the pilot symbols by a predetermined spreading sequence of a subgroup of spreading sequences allocated to the mobile terminal which transmits the pilot symbols,
- means for de-spreading data symbols transmitted by each mobile terminal by multiplying the data symbols by the other spreading sequences of the subgroup of spreading sequences allocated to the mobile terminal which transmits the data symbols,
- means for estimating the channel frequency response between each mobile terminal and the base station based on the observation of the de-spread pilot symbols,
- means for equalizing each de-spread data symbols according to the estimation of the channel frequency response between the respective mobile terminal which transmits the data symbols and the base station.

Thus, the estimation of a plurality of radio channels is accurate and simple. This channel estimation scheme exploits the fact that, for each user, the channel affects in the same manner the spread pilot symbols and the spread data symbols.

According to still another aspect, the present invention concerns a mobile terminal which receives a subgroup of spreading sequences from a base station in a Multi-Carrier Code Division Multiple Access transmission Network, characterised in that the mobile terminal comprises:
- means for determining among the subgroup of spreading sequences received from the base station a first spreading sequence
- means for multiplying each element of the first spreading sequence by pilot symbols to be transmitted and then transmitted on a corresponding sub-carrier,
- means for multiplying each element of the at least one other spreading sequence of the subgroup of spreading sequences by data symbols to be transmitted and then transmitted on a corresponding sub-carrier.

According to still another aspect, the present invention concerns a computer program which can be directly loadable into a programmable device, comprising instructions or portions of code for implementing the steps of the method according to the invention, when said computer program is executed on a programmable device. Since the features and advantages relating to the computer program are the same as those set out above relating to the method and device according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which.

DESCRIPTION OF THE PREFERRED EMBODIMENTS

Figure 1:
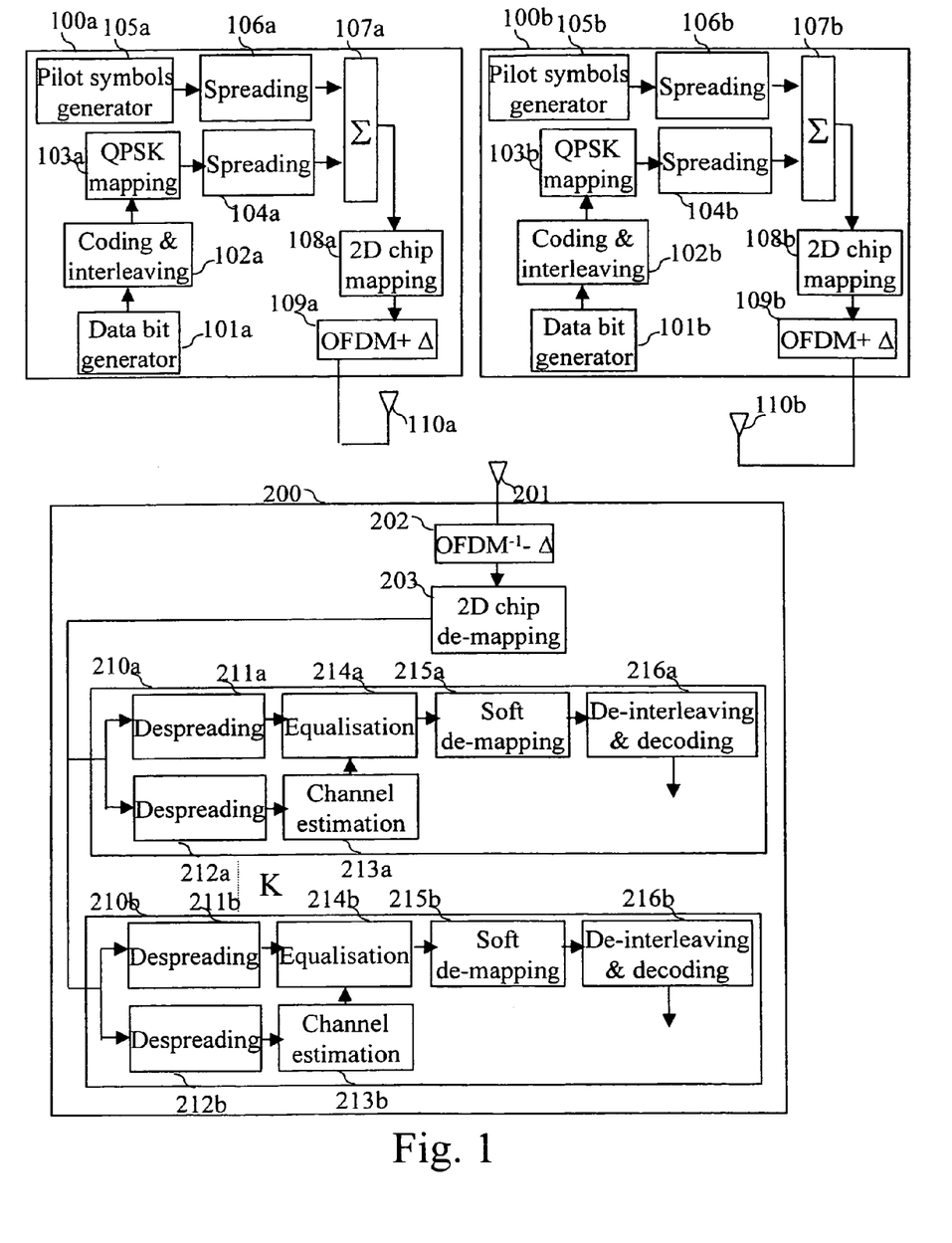
FIG. 1 is a block diagram of a base station and mobile terminals according to the invention.

FIG. 1 is a block diagram of a base station and mobile terminals according to the invention.

FIG. 1 discloses mobile terminals 100 in communication with a base station 200. For sake of simplicity, only two mobile terminals 100a and 100b are shown in FIG. 1 but It has to be understood that in the network wherein the invention is used, much more mobile terminals 100 are in communication with the base station 200.

The mobile terminal 100a comprises a data bit generator 101a which provides data to be transmitted to the base station 200. These data are, as example, representative of audiovisual data, text and so on. The data to be transmitted are coded and interleaved by the coding and interleaving means 102a. The coded and interleaved data are then mapped according to a modulation scheme by the mapping block 103a in order to form data symbols. Such modulation scheme is as example a Quaternary Phase Shift Keying or QPSK. The data symbols are then spread over L element of at least a spreading sequence. The data symbols are spread by the spreading block 104a.

In addition, the mobile terminal 100a comprises a pilot symbols generator 105a. The pilot symbols are spread over L element of a spreading sequence by the spreading block 106a.

Thus, in this scheme, a maximum of L/2 different mobile terminals 100 can transmit data simultaneously to the base station 200 in a given spreading slot.

The spreaded data and pilot symbols are then summed by an adder 107a to form a stream of length L. This stream is then mapped in time and frequency by a two dimensional chip mapping block 108a in the multi-carrier frame composed of NF sub-carriers and NT time slots. This chip mapping aims at minimising the Multi Access Interference (MAI) arising from the loss of orthogonality between mobile terminals signals due to channel selectivity, while the diversity of the channel is exploited by the channel decoder thanks to the bit interleaver. It has to be noted here that the mapping in time and frequency by the two dimensional chip mapping block 108a is made in order to reduce the effect of the channel selectivity by defining groups of sub-channels that are highly correlated within the multi-carrier frame. By allocating chips to consecutive sub-carriers and/or consecutive time slots for each mobile terminal, the fading coefficients are almost constant on the mapping area containing the L chips of the data and the pilot symbols. Thus, the orthogonality among signals transmitted from different mobile terminals is restored although these signals propagate through different channels. The estimation of the plurality of radio channels becomes simple and efficient.

The stream mapped in time and frequency is then modulated by an OFDM modulator 109a and a cyclic prefix noted $\Delta$ is added in order to avoid inter-symbol interference at the base station 200. K signals are transmitted through antennas 110 by K mobile terminals toward the base station 200 and propagated through K distinct multipath channels corrupted by Additive White Gaussian Noise (AWGN).

The mobile terminal 100b is identical to the mobile terminal 100a. The data bit generator 101b is identical to the data bit generator 101a, it will not be described anymore. The coding and interleaving block 102b is identical to the coding and interleaving block 102a, it will not be described anymore. The QPSK mapping block 103b is identical to the QPSK mapping block 103a, it will not be described anymore. The pilot symbols generator 105b is identical to the pilot symbols generator 105a, it will not be described anymore. The spreading block 104b and 106b are identical to the spreading blocks 104a and 106a, they will not be described anymore. The adder 107b, the two dimensional chip mapping 108b and the OFDM modulator 109b are identical to the adder 107a, the two dimensional chip mapping 108a and the OFDM modulator 109a, they will not be described anymore.

According to the invention, a subgroup of spreading sequences is allocated by the base station 200 to each mobile terminal 100. Each mobile terminal 100 comprises means (not shown in FIG. 1) for determining, among the subgroup of spreading sequences received from the base station, a first spreading sequence.

Each mobile terminal comprises means for multiplying each element of the first spreading sequence by pilot symbols to be transmitted and then transmitted on a corresponding sub-carrier and means for multiplying each element of the at least one other spreading sequence of the subgroup of spreading sequences by data symbols to be transmitted and then transmitted on a corresponding sub-carrier.

The base station 200 receives through the antenna 201 the sum of K synchronised signals generated by K mobile terminals 100.

The base station 200 comprises an OFDM demodulator 202 which demodulates the received signal and removes the cyclic prefix $\Delta$. The demodulated signal is then de-mapped in time and frequency by a two dimensional chip de-mapping block 203.

The de-mapped signal is then fed to K mobile modules 210. In FIG. 1, only two mobile modules 210 are shown. In fact, the base station 200 comprises as much as mobile modules as they are mobile terminals 100 in the MC-CDMA transmission network. The mobile module 210a is able to decode the symbols received from the mobile terminal 100a and the mobile module 210b is able to decode the symbols received from the mobile terminal 100b. The mobile module 210a is able to conduct a channel estimation of the channel between the mobile terminal 100a and the base station 200, the mobile module 210b is able to conduct a channel estimation of the channel between the mobile terminal 100b and the base station 200.

The mobile modules 210a and 210b are identical, only the mobile module 210a will be described in detail.

The mobile module 210a comprises a de-spreading block 211a which de-spreads the data symbols transmitted by the mobile 100a by multiplying the de-mapped signal by the same spreading sequence(s) that the one(s) used by the mobile 100a for the spreading of data symbols.

The mobile module 210a comprises a de-spreading block 212a which de-spreads the pilot symbols transmitted by the mobile terminal 100a by multiplying the de-mapped signal by the same spreading sequence that the one used by the mobile terminal 100a for the spreading of pilot symbols. The de-spread pilot symbols are then fed to a channel estimation module 213a which estimates the channel frequency response between the mobile 100a and the base station 200 based on the received pilot symbol observation. The estimation of the channel frequency response is then fed to an equalisation module 214a which compensates the channel impairments on the de-spread data symbols.

The equalised data symbols are then demapped by a de-mapping module 215a. The de-mapping module 215a is more precisely a soft de-mapping module. The de-mapped data symbols are then de-interleaved and decoded by a de-interleaving and decoding block 216a in order to retrieve the transmitted data of the mobile 100a.

Figure 2:
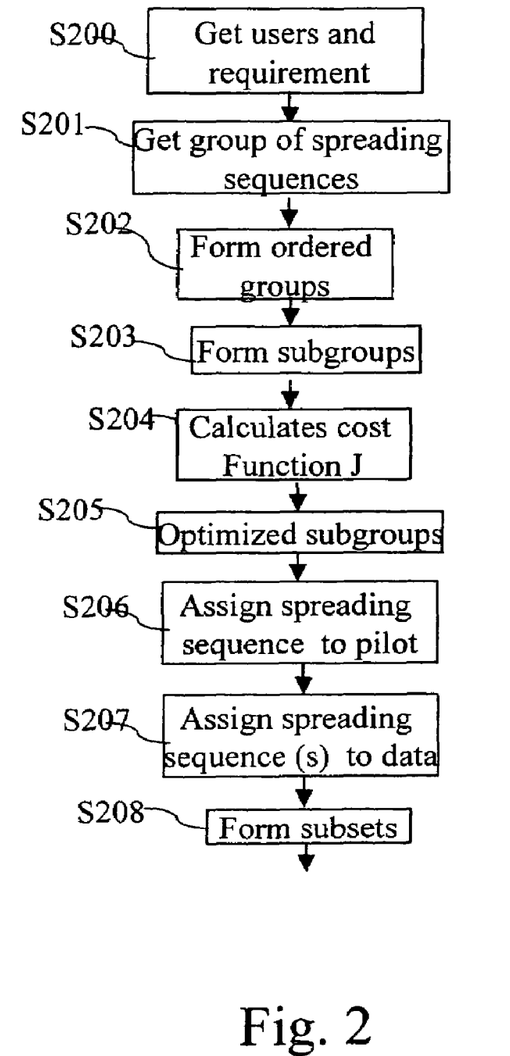
FIG. 2 is an algorithm for dynamically assigning subgroups of spreading sequences of a set of spreading sequences to mobile terminals of a Multi-Carrier transmission network according to a first embodiment.

FIG. 2 is an algorithm for dynamically assigning subgroups of spreading sequences of a set of spreading sequences to mobile terminals of a Multi-Carrier transmission network according to a first embodiment.

The code of this flow chart is for example stored in non volatile ROM memory not shown in FIG. 1 of the base station 200. Regularly or each time a new active mobile terminal is registered on the base station 200 or each time an active mobile terminal becomes inactive or anytime one or more mobile terminals have a new requirement in term of spreading sequence, the base station 200 executes the instructions associated to the algorithm described in the FIG. 2.

At step S200, the base station 200 determines the active mobile terminals in the MC-CDMA network and obtains their respective requirements in term of number of spreading sequences to be allocated to them.

At next step S201, the base station 200 forms or read in the ROM memory a set $\Omega$ of $L_N$ spreading sequences that is able to satisfy the requirements of active mobile terminals. The total requirement of active mobile terminals is equal to A spreading sequences where $L_N \geq A$. Preferably, these spreading sequences are Walsh-Hadamard spreading sequences of length $L=L_N \geq A$.

These spreading sequences can be also a subset of A spreading sequences as disclosed in the article of Qinghua Shi and M. Latva-aho "simple spreading code allocation scheme for downlink MC-CDMA published in Electronics Letters the 18$^{th}$ July 2002.

A next step S202, the base station 200 forms P ordered groups $\Omega^p$ of spreading sequences able to satisfy the requirement of active mobile terminals. It has to be noted here that the number P of ordered groups is $P=L_N!/(L_N-A)!$.

At next step S203, the base station 200 partitions each of the $\Omega^p$ ordered groups of spreading sequences into K non overlapping subgroups $\Omega_k^p$, each subgroup gathering the $N_k+1$ sequences required by a mobile terminal k, where $N_k$ is the number of spreading sequences to allocate for data symbols to mobile k and 1 is the number of spreading sequence to allocate for pilot symbols to mobile k.

At next step S204, the base station 200 calculates the cost function noted cost function J for the subgroup $\Omega_k^p$. As example, the cost function is the cost function as disclosed in the paper of Mottier and Castelain "A spreading sequence allocation procedure for MC-CDMA transmission systems" Proc IEEE VTC'2000, September 2000 vol 3, pp 1270-1275. It takes into account the maximal degradation that is experienced by two of the spreading sequences of the subgroups formed at step S203.

At next step S205, the base station 200 determines the optimised ordered group $\Omega^0$ of spreading sequences for the active mobile terminals using the following formula:

$$\Omega^0 = \arg \min_{\Omega^P \subset \Omega, p=1\ldots P} \max_{k=1\ldots K} (J(\Omega_k^P))$$

The optimised subgroups are respectively the subgroups comprised within the optimised ordered group $\Omega^0$ of spreading sequences. Using such formula, the base station 200 finds among all subgroups, the subgroups of which the maximum interference among spreading sequences of a subgroup is minimum. The optimised subgroups are then respectively allocated to active mobile terminals 100.

At next step S206, the base station 200 allocates for each active mobile terminal 100 a spreading sequence for the spreading of pilot symbols. According to a preferred embodiment, each spreading sequence allocated to an active mobile terminal 100 for the spreading of pilot symbols is the spreading sequence, among the subgroup $\Omega_k^p$ of spreading sequences allocated at step S206 to the active mobile terminal 100k, which has the minimum interference calculated according to the cost function $J(\Omega_k^p)$ with other spreading sequences of the subgroup of spreading sequences $\Omega_k^p$ allocated to the active mobile terminal 100k.

At next step S207, the base station 200 allocates for each active mobile terminal 100, the required spreading sequences for the spreading of data symbols. The spreading sequences allocated to an active mobile terminal 100 for the spreading of data symbols are the other spreading sequences of the subgroup of spreading sequences allocated to the active mobile terminal than the one allocated for the spreading of pilot symbols.

A next step S208, the base station 200 transfers to each active mobile terminal 100 the subgroup of spreading sequences comprising the spreading sequences determined at steps S206 and S207.

Thus, the set of spreading sequences is decomposed into a plurality of ordered groups of spreading sequences, the ordered groups of spreading sequences are divided into non overlapping subgroups of spreading sequences, an optimised ordered group of spreading sequences among the ordered groups of spreading sequences is determined by minimizing the degradation that is experienced between spreading sequences of each respective subgroup and the subgroups of spreading sequences comprised in the optimised ordered group are assigned to mobile terminals.

More precisely, the determination of the optimised ordered group is made by calculating, for each subgroup of each ordered group of spreading sequences, a cost function which takes into account the maximal degradation that is experienced by pairs of spreading sequences of the subgroup and the optimised ordered group of spreading sequences is determined as the ordered group of spreading sequences which comprises the subgroups of which the maximum value of the calculated cost function among each subgroup is minimum.

It has to be noted also here that instead of using Walsh-Hadamard spreading sequences, other kinds of spreading sequences can be used in the present invention. As example, orthogonal complementary Golay sequences can be used also.

Figure 3:
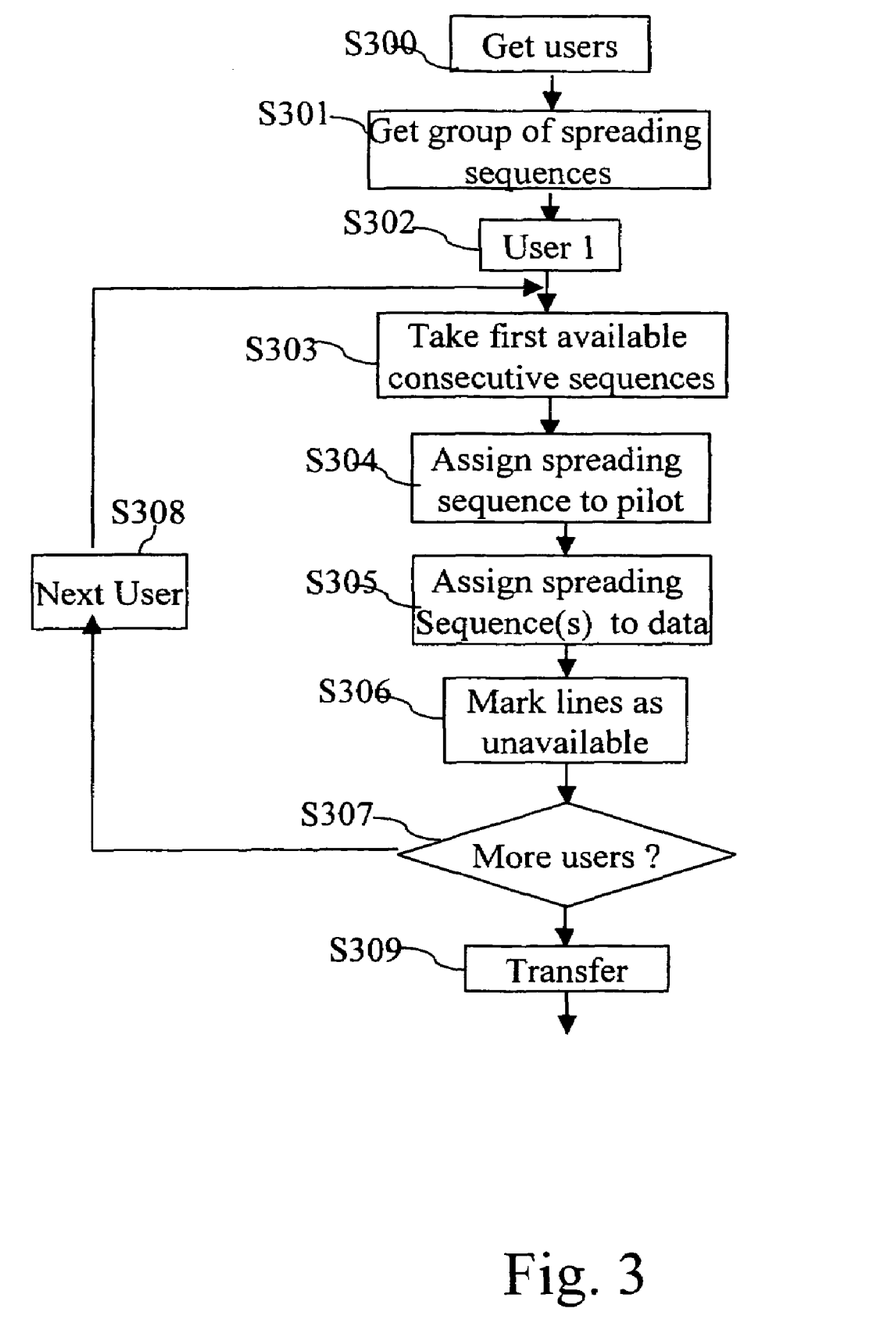
FIG. 3 is an algorithm for dynamically assigning subgroups of spreading sequences of a set of spreading sequences to mobile terminals of a Multi-Carrier transmission network according to a second embodiment.

FIG. 3 is an algorithm for dynamically assigning subgroups of spreading sequences of a set of spreading sequences to mobile terminals of a Multi-Carrier transmission network according to a second embodiment.

The code of this flow chart is for example stored in a non volatile ROM memory not shown in FIG. 1 of the base station 200. Regularly or each time a new active mobile terminal is registered on the base station 200 or each time an active mobile terminal 100 becomes inactive or anytime one or more mobile terminals have a new requirement in term of spreading sequence, the base station 200 executes the instructions associated to the algorithm described in the FIG. 3.

At step S300, the base station 200 determines the active mobile terminals in the MC-CDMA network and obtains their respective requirements in term of number of spreading sequences to be allocated to them.

As example, two mobile terminals 100a and 100b are currently active. The mobile terminal 100a needs one spreading sequence for the pilot symbols and two spreading sequences for the data symbols. The mobile terminal 100b needs one spreading sequence for the pilot symbols and one spreading sequence for the data symbols. Each of the required spreading sequence has a length of L equal to eight.

At next step S301, the base station 200 forms or read in the ROM memory a set of spreading sequences that is able to satisfy the requirements of active mobile terminals. These spreading sequences are preferably a set of Walsh-Hadamard spreading sequences of length L comprised within an original Walsh-Hadamard matrix $W_L$.

An original Walsh-Hadamard matrix $W_L$ of size L is defined by the following iterative rule:

$$W_1 = 1$$
$$W_L = \begin{bmatrix} W_{L/2} & W_{L/2} \\ W_{L/2} & -W_{L/2} \end{bmatrix}$$

It has to be noted here that the lines or the columns of an original Walsh-Hadamard matrix $W_L$ formed by that iterative rule are ordered in an order which is called the natural order of a Walsh-Hadamard matrix.

According to our example, five spreading sequences of length L are required, so an original Walsh-Hadamard matrix $W_L$ of size 8 is required. Such matrix is disclosed in FIG. 5.

These spreading sequences can be also a subset of spreading sequences as disclosed in the article of Qinghua Shi and M. Latva-aho "simple spreading code allocation scheme for downlink MC-CDMA published in Electronics Letters the 18$^{th}$ July 2002.

At step S302, the base station 200 considers an active mobile terminal among the active mobile terminals identified at step S300. As example, the mobile terminal 100a is then considered.

At step S303, the base station 200 takes the subgroup of spreading sequences of the group of ordered spreading sequences which is able to satisfy the mobile terminal 100a requirements.

Figure 5:
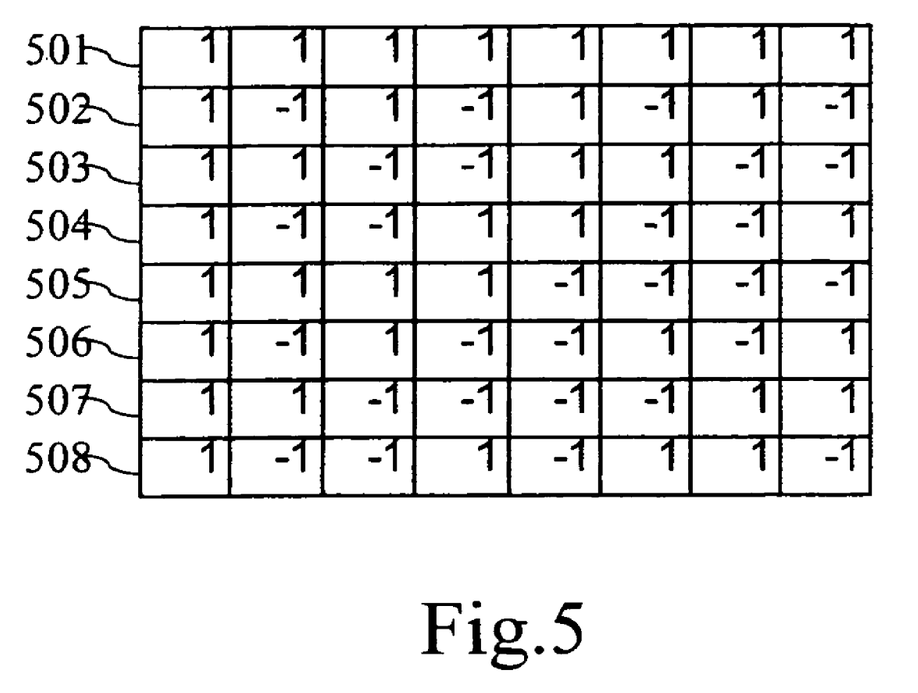
FIG. 5 is an example of an original Walsh-Hadamard matrix $W_L$ of size L equal to eight.

As the mobile terminal 100a needs one spreading sequence for the pilot symbols and two spreading sequences for the data symbols, three spreading sequences are required, the subgroup made by the lines notes 501 to 503 of FIG. 5 is then assigned to the mobile terminal 100a. It has to be noted here that the lines of the subgroup are consecutive lines of the Walsh-Hadamard matrix taken in the natural order.

At step S304, the base station 200 assigns the first spreading sequence of the subgroup of spreading sequences according to the natural order of the Walsh Hadamard matrix for the spreading of the pilot symbols for the mobile terminal 100a. According to our example, the first spreading sequence of the subgroup is the line 501 of the matrix of FIG. 5.

At step S305, the base station 200 assigns the remaining spreading sequences of the subgroup of spreading sequences for the spreading of the data symbols for the mobile terminal 100a. According to our example, the remaining spreading sequences of the subgroup of spreading sequences are the lines 502 and 503 of the matrix shown in FIG. 5.

At step S306, the base station 200 marks the previously allocated spreading sequences as unavailable. According to our example, the base station marks lines 501 to 503 as unavailable.

At step S307, the base station 200 checks whether or not they are some other active mobile terminals determined at step S300 for which a subgroup of spreading sequences has not been allocated. If they are some, the base station 200 moves to step S308, considers another active mobile terminal, and executes the loop made by steps S303 to S308 as far as a subgroup of spreading sequences has not been assigned to all active mobile terminals.

According to our example, no subgroup of spreading sequences has been allocated to the mobile terminal 100b. The base station 200 moves to step S308 and considers the mobile terminal 100b.

At step S303, the base station 200 takes the subgroup of spreading sequences of the group of ordered spreading sequences which is able to satisfy the mobile terminal 100b requirements. As the mobile terminal 100b needs one spreading sequence for pilot symbols and one spreading sequence for data symbols, two spreading sequences are required, the base station 200 takes then the first available spreading sequences of the Walsh-Hadamard matrix of FIG. 5. Then, the base station 200 takes the subgroup made by the lines notes 504 and 505 of FIG. 5 for the mobile terminal 100b. It has to be noted here that the lines of the subgroup are consecutive line of the Walsh-Hadamard matrix taken in the natural order.

At step S304, the base station 200 assigns the first spreading sequence of the subgroup of spreading sequences, for the spreading of the pilot symbols for mobile terminal 100b. According to our example, the first spreading sequence of the subgroup of spreading sequences is the line 504 of the matrix of FIG. 5.

At step S305, the base station 200 assigns the remaining spreading sequence of the subgroup of spreading sequences for the spreading of the data symbols for the mobile terminal 100b. According to our example, the remaining spreading sequence of the subgroup of spreading sequences is the line 505 of the matrix of FIG. 5.

At step S306, the base station 200 marks the previously allocated spreading sequences as unavailable. According to our example, the base station marks lines 504 and 505 as unavailable.

At step S307, the base station 200 checks whether or not they are some other active mobile terminals determined at step S300 for which a subgroup of spreading sequences has not been allocated. According to our example, there is no more active mobile terminal, the base station 200 moves to step S309 and transfers the assigned subgroups of spreading sequences to active mobile terminals.

The lines 506 to 508 of the Walsh-Hadamard matrix of FIG. 5 comprise also Walsh-Hadamard sequences which are not used according to our example.

It has to be noted also here that instead of using Walsh-Hadamard spreading sequences, other kind of spreading sequences can be used in the present invention. As example, orthogonal complementary Golay sequences can be used also.

In a variant, the base station 200, at step S303, takes also the subgroup of available spreading sequences following the first available spreading sequence of the ordered Walsh Hadamard.

The base station 200 calculates for each subgroup the maximal degradation that is experienced by two of the spreading sequences of the sequences of the subgroup as disclosed in the paper of Mottier and Castelain "A spreading sequence allocation procedure for MC-CDMA transmission systems" Proc IEEE VTC'2000, September 2000 vol 3, pp 1270-1275 for both subgroups.

The base station selects the subgroup of spreading sequences among the two selected subgroups which provides the minimum interference.

Figure 4:
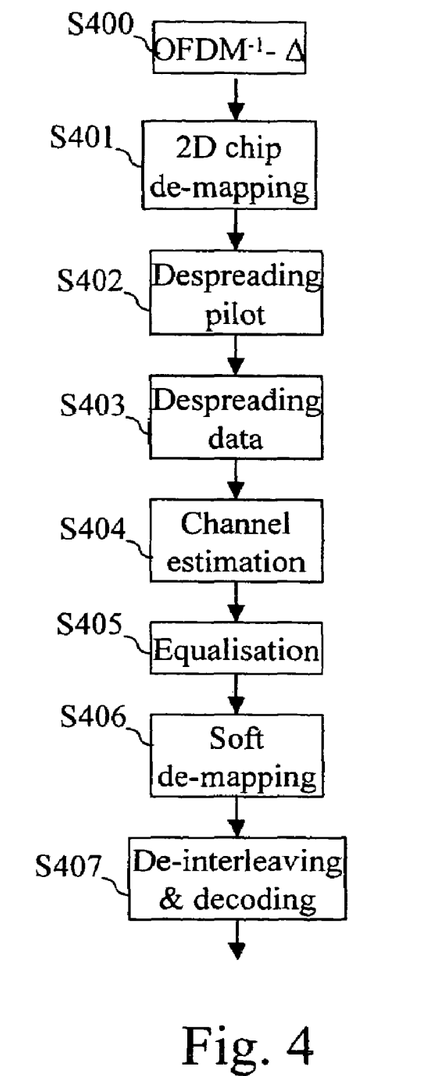
FIG. 4 is an algorithm for channel equalization of data symbols based on an estimation on spread pilot symbols according to the invention.

FIG. 4 is an algorithm for channel equalization of data symbols based on an estimation on spread pilot symbols according to the invention.

At step S400, the base station 200 demodulates the received signal and removes the cyclic prefix Δ for the sum of K synchronised signals generated by K active mobile terminals 100 through the antenna 201.

At step S401, the base station 200 de-mapped in time and frequency the demodulated signal by a two-dimensional chip de-mapping block 203.

At step S402, the base station 200 de-spreads each pilot symbols transmitted by each mobile terminal by multiplying the de-mapped signal by the same spreading sequence that the one used by the respective mobile terminal for the spreading of pilot symbols.

At step S403, the base station 200 de-spreads each data symbols transmitted by each mobile terminal by multiplying the de-mapped signal by the same spreading sequence(s) that the one(s) used by the respective mobile terminal for the spreading of data symbols.

At step S404, the base station 200 estimates the channel frequency response between each active mobile terminal 100 and the base station 200 based on the observation of the respective pilot symbols received.

At step S405, the base station 200 equalizes the de-spread data symbols received by each active mobile terminal 100 according to the respective estimation of the channel frequency response made at step S404.

At step S406, the base station 200 de-maps the equalized data symbols received by each active mobile terminal.

At step S407, the base station 200 de-interleaves and decodes the de-mapped data symbols in order to retrieve the transmitted data of the active mobile terminals 100.

Naturally, many modifications can be made to the embodiments of the invention described above without departing from the scope of the present invention.

The invention claimed is:

1. A method of communication in a Multi-Carrier transmission network including plural mobile terminals, the method comprising:
   dynamically assigning subgroups of spreading sequences of a set of spreading sequences to each of the mobile terminals of the subgroups including different spreading sequences than in other subgroups, and each of the subgroups of spreading sequences comprises a first spreading sequence and at least one other spreading sequence;
   multiplying, by the mobile terminal to which the first spreading sequence is assigned, each element of the first spreading sequence by pilot symbols to be transmitted to produce multiplied pilot symbols;
   transmitting the multiplied pilot symbols on a corresponding sub-carrier;
   multiplying, by the mobile terminal to which the at least one other spreading sequence is assigned, each element of the at least one other spreading sequence by data symbols to be transmitted to produce multiplied data symbols; and
   transmitting the multiplied data symbols on a corresponding sub-carrier.

2. The method according to claim 1, wherein, for each of the subgroups, the dynamically assigning assigns the first spreading sequence of a corresponding subgroup of spreading sequences to be a spreading sequence which results in a least amount of interference coming from the other spreading sequences of the corresponding subgroup of spreading sequences.

3. The method according to claim 2, further comprising:
   decomposing the set of spreading sequences into a plurality of ordered groups of spreading sequences;
   dividing the ordered groups of spreading sequences into non-overlapping subgroups of spreading sequences;
   determining an optimised ordered group of spreading sequences among the ordered groups of spreading sequences by minimizing a degradation between spreading sequences of each respective subgroup; and
   assigning the subgroups of spreading sequences comprised in the optimised ordered group to each of the mobile terminals.

4. The method according to claim 3, wherein the determining the optimised ordered group further comprises calculating, for each subgroup of each ordered group of spreading sequences, a cost function which takes into account a maximal degradation that is experienced by pairs of spreading sequences of the subgroup and the optimised ordered group of spreading sequences is determined as an ordered group of spreading sequences which comprises the subgroups of which the maximum value of the calculated cost function among each subgroup is minimum.

5. The method according to claim 1, wherein the spreading sequences are Walsh-Hadamard sequences, and the subgroups of spreading sequences are composed of the lines or the columns of a natural Walsh-Hadamard matrix.

6. The method according to claim 5, further comprising forming each subgroup of spreading sequences by consecutive lines or columns of the natural Walsh-Hadamard matrix.

7. The method according to claim 6, wherein the first line or column of a subgroup is consecutive, in the natural Walsh-Hadamard matrix, to the last line or column of another subgroup of spreading sequences.

8. The method according to claim 1, wherein the Multi-Carrier transmission network includes a Multi-Carrier Code Division Multiple Access transmission Network.

9. A method of equalization of data symbols transmitted by mobile terminals to a base station in a Multi-Carrier Code Division Multiple Access transmission Network and performed by the base station, the method comprising:
   de-spreading pilot symbols transmitted by each mobile terminal by multiplying the pilot symbols by a predetermined spreading sequence of a subgroup of spreading sequences allocated to the mobile terminal which transmits the pilot symbols, the subgroup of spreading sequences allocated to the mobile terminal including a plurality of spreading sequences and including different spreading sequences than in other subgroups;
   de-spreading data symbols transmitted by each mobile terminal by multiplying the data symbols by the other spreading sequences of the subgroup of spreading sequences allocated to the mobile terminal which transmits the data symbols;
   estimating the channel frequency response between each mobile terminal and the base station based on the observation of the de-spread pilot symbols transmitted by the respective mobile terminal; and
   equalizing each de-spread data symbols according to the estimation of the channel frequency response between the respective mobile terminal which transmits the data symbols and the base station.

10. A base station that receives spread symbols from mobile terminals in a Multi-Carrier Code Division Multiple Access transmission Network, the base station comprising:
   a pilot symbol de-spreading block configured to de-spread pilot symbols transmitted by each mobile terminal by multiplying the pilot symbols by a predetermined spreading sequence of a subgroup of spreading sequences allocated to the mobile terminal which transmits the pilot symbols, the subgroup of spreading sequences allocated to the mobile terminal including a plurality of spreading sequences and including different spreading sequences than in other subgroups;
   a data symbol de-spreading block configured to de-spread data symbols transmitted by each mobile terminal by multiplying the data symbols by the other spreading sequences of the subgroup of spreading sequences allocated to the mobile terminal which transmits the data symbols;
   an estimation module configured to estimate the channel frequency response between each mobile terminal and the base station based on the observation of the de-spread pilot symbols; and
   an equilisation module configured to equilise each of the de-spread data symbols according to the estimation of the channel frequency response between the respective mobile terminal which transmits the data symbols and the base station.

11. A mobile terminal that receives a subgroup of spreading sequences from a base station in a Multi-Carrier Code Division Multiple Access transmission Network, the subgroup of spreading sequences including a plurality of spreading sequences and including different spreading sequences than in other subgroups of spreading sequences allocated to other mobile terminals in the Network, the mobile terminal comprising:

a determining module configured to determine among the subgroup of spreading sequences received from the base station a first spreading sequence;

a pilot symbol multiplying module configured to multiply each element of the first spreading sequence by pilot symbols to be transmitted, and and transmit the multiplied pilot symbols on a corresponding sub-carrier; and a data multiplying module configured to multiply each element of the at least one other spreading sequence of the subgroup of spreading sequences by data symbols to be transmitted, and transmit the multiplied data symbols on a corresponding sub-carrier.

12. A computer-readable medium storing instructions, which when executed by a computer, cause the computer to perform a method of communication in a Multi-Carrier transmission network including plural mobile terminals, the method comprising:

dynamically assigning subgroups of spreading sequences of a set of spreading sequences to each of the mobile terminals, each of the subgroups including different spreading sequences than in other subgroups, and each of the subgroups of spreading sequences comprising a first spreading sequence and at least one other spreading sequence;

multiplying, by the mobile terminal to which the first spreading sequence is assigned, each element of the first spreading sequence by pilot symbols to be transmitted to produce multiplied pilot symbols;

transmitting the multiplied pilot symbols on a corresponding sub-carrier;

multiplying, by the mobile terminal to which the at least one other spreading sequence is assigned, each element of the at least one other spreading sequence by data symbols to be transmitted to produce multiplied data symbols; and transmitting the multiplied data symbols on a corresponding sub-carrier.

* * * * *